United States Patent [19]

Teske et al.

[11] 4,043,619
[45] Aug. 23, 1977

[54] SLIDING RING SEAL

[76] Inventors: Fritz Teske, Industriestr. 28; Lothar Teske, Industriestr. 30, both of 505 Porz, Germany

[21] Appl. No.: 498,039

[22] Filed: Aug. 16, 1974

[51] Int. Cl.² .......................................... F16C 33/78
[52] U.S. Cl. ................................. 308/187.1; 277/80
[58] Field of Search ................ 308/36.1, 36.3, 187.1, 308/187.2, 10; 277/80

[56] References Cited
U.S. PATENT DOCUMENTS

| 3,128,104 | 4/1964 | Teske | 277/80 X |
| 3,700,248 | 10/1972 | Teske et al. | 308/187.1 X |

*Primary Examiner*—Philip Goodman
*Assistant Examiner*—Gene A. Church
*Attorney, Agent, or Firm*—Diller, Brown, Ramik & Wight

[57] ABSTRACT

This disclosure relates to a sliding ring seal for bearings which includes a pair of annular members, a pair of annular rings constructed of metallic material, a flexible non-metallic annular seal, and one or more annular retaining rings of magnetically attractable or ferromagnetic material with the seal being sandwiched between the magnetic rings and the retaining rings as well as within the pair of annular members.

15 Claims, 5 Drawing Figures

SLIDING RING SEAL

The novel invention herein disclosed relates to a sliding ring seal for bearings, particularly roller bearings mounted between stationary and rotating machine parts, and is designed primarily as a supplemental seal.

Conventional bearings having annular members or races associated with relatively rotating machine parts are sealed by annular sealing discs at axially opposite sides, and such sealing discs are held in position by means of permanent magnets.

Sliding ring seals are also known in which the sealing disc is constructed of thin steel so as to be flexible, and due to the ferromagnetic attributes of the sealing disc it performs the dual function of a separate seal and a separate retaining ring. However, this construction is a compromise solution because as the flexibility of the steel or other ferromagnetic sealing disc is increased by a relatively thin construction of the disc the same thinness reduces the holding force created by a permanent magnet. Moreover, the thinner the construction of the steel sealing disc the greater is the unconstricted flux of the magnetic force resulting in a detrimental effect upon adjacent machine parts and, of course, the encouragement of attracting dirt particles.

In keeping with the foregoing, it is a primary object of this invention to provide a novel sliding ring seal which achieves excellent sealing disc flexibility along with optimum utilization of magnetic forces to achieve an excellent sealing effect between relatively rotating machine parts. The sliding ring seal includes a pair of annular members rotatable relative to each other but non-rotatably associated with the respective rotating machine parts, the annular members being in relative telescopic relationship with common axes, and including a gap therebetween covered at axially opposite sides by flexible annular sealing discs with the sealing effect being obtained through the attractive force of magnets. The invention is particularly characterized by the construction of the annular discs from flexible non-metallic material with the discs being sandwiched between magnetic rings and retaining rings or between magnetic rings and appropriate faces of the annular members, and with the retaining rings being constructed on non-magnetic material with ferromagnetic properties to obtain the desired optimized sealing.

The foregoing novel construction of this invention provides reliable separation of the bearing components to satisfy the demand for flexibility on the one hand to achieve optimum sealing, while on the other hand a high magnetic force is achieved because the retaining rings can be of substantial thickness to obtain the most efficient use of the magnetic forces. In this manner the purpose of the sealing disc is simply that of achieving a seal whereas the function of the retaining rings, or in one case a retaining disc, is to provide optimum utilization of the magnetic force in applying the sealing action to the sliding ring seal. In further accordance with such construction the thickness of the retaining rings may be selected independently of the thickness of the annular sealing discs so that it is possible for the retaining rings to be substantially thicker without in any way imparing the flexibility and sealing characteristics of the sealing discs.

The size of the retaining rings is designed with knowledge of the predetermined magnetic forces involved such that no magnetic force emerges outwardly of the overall bearing. This separation of the properties of the bearing across different independent components insures that the construction of each can be at an optimum with regard to the properties desired therefrom to achieve overall benefits regarding the magnetic force, flexibility and slidability which cannot be achieved in conventional integral units of this type.

The present construction also achieves important manufacturing advantages because the various components are either annular or disc shaped and therefore can be manufactured at relatively low cost and with simplified machinery.

The sliding ring seal constructed in accordance with this invention may be an independent supplementary seal or simply a sliding ring seal associated with a roller bearing or a ball bearing. In the last-mentioned case the system can be so arranged that the sliding ring seal is disposed in an annular or peripheral groove of the bearing races of the roller bearing or the like so that the sealing disc bears directly against the faces of the bearing races and is held thereto by exterior retaining rings drawn axially inwardly under the influence of permanent magnet rings.

In roller bearings or air bearings the magnetic rings themselves may form the bearing races and sandwich between the same and magnetically retractable retaining rings are the sealing discs.

In both cases the thickness of the retaining rings is such that the magnetic lines or lines of force which extend from the poles of each annular magnetic ring are in a closed loop having a height as viewed in radial cross section approximately that of its associated ring. Thus all magnetic lines which emerge from the magnetic rings and the retaining rings are confined to the latter to achieve exceptionally powerful magnetic force attraction without magnetic forces emerging outwardly of the retaining rings or the bearing per se. Thus the magnetic forces exteriorly of the bearing are in effect neutral. As a result no magnetic attraction is applied to adjacent machine parts and dirt particles, machinery chips or the like are not attracted to the bearing area. Moreover since the sealing discs are constructed of plastic, elastic, or similar nonmagnetic material the lines of force passing therethrough between the magnetic rings and the retaining rings are not impared.

The sealing discs are also preferably constructed from material which is impermeable to gas, has good sliding characteristics and smoothness. Such material as tetrafluorethylene (Teflon) is one such suitable material. By appropriate molding techniques the sealing discs preferably have stiff outer edges whereas the central circumferential portion is thinner in order to increase the flexibility in the sealing zone.

With the above and other objects in view that will hereinafter appear, the nature of the invention will be more clearly understood by reference to the following detailed description, the appended claimed subject matter, and the several views illustrated in the accompanying drawing.

1, and illustrates the general overall annular configuration of the various rings, sealing discs and annular members which in further embodiment constitute the races of roller or ball bearing.

Figures 3, 4:
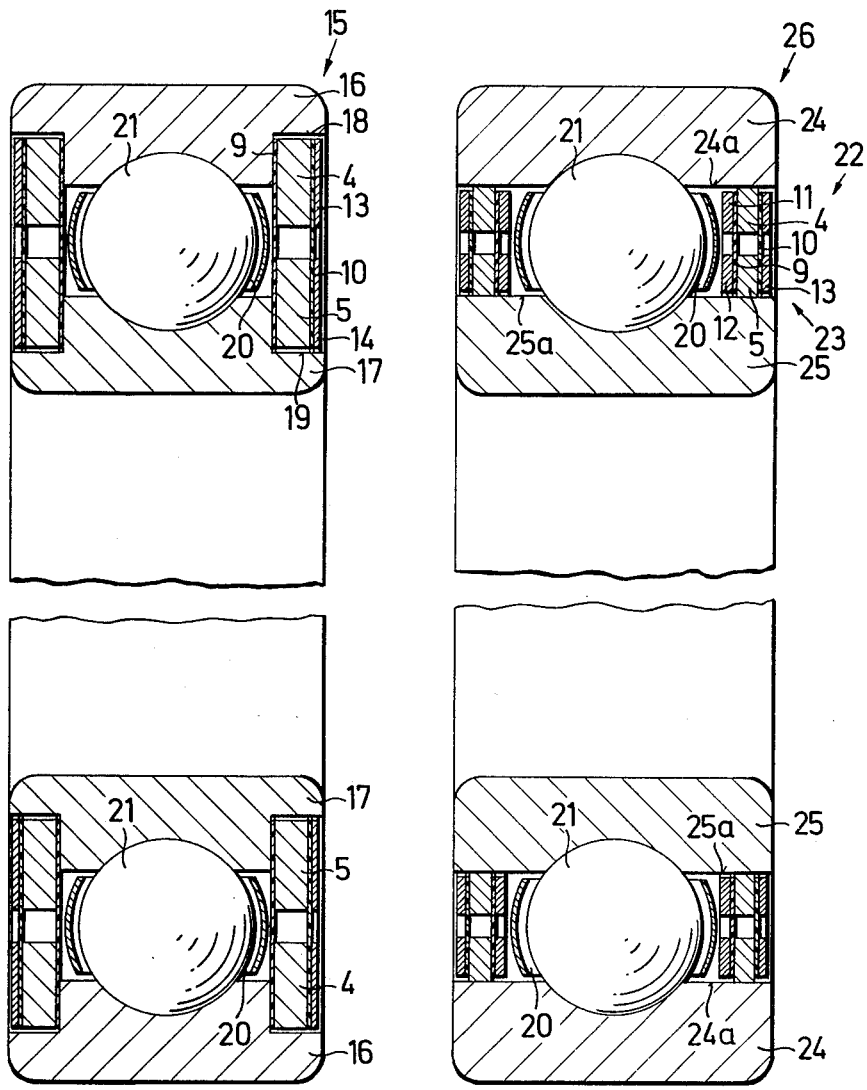

FIG. 3 is a fragmentary axial view through another sliding ring seal of this invention, and illustrates two discs at each end face of annular races retained in position through the effects of magnetic and retaining rings.

FIG. 4 is a fragmentary axial view through another sliding ring seal constructed in accordance with this invention, and illustrates at each axial end face of the bearing two pair of annular retaining rings, two sealing discs and a single pair of magnetic rings.

Figure 5:
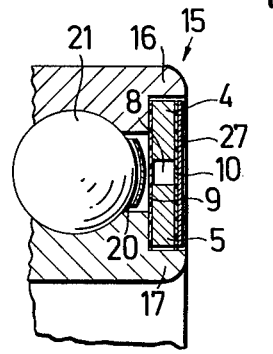

FIG. 5 is a fragmentary view through an axial portion of another sliding ring seal constructed in accordance with this invention, and in lieu of a pair of retaining rings a single retaining ring is employed in association with a pair of sealing discs and a pair of magnetic rings.

A novel sliding ring seal constructed in accordance with this invention is generally designated by the reference numeral 1 (FIG. 1) and may be, for example, in the form of a supplementary seal for bearings such as roller bearings. The sliding ring seal 1 includes a pair of annular members 2,3 which rotate relative to each other. The annular members 2,3 are generally U-shaped in axial section and defined therebetween opposing annular recesses 6,7 which receive rings 4,5 formed as permanent magnets. The rings 4,5 have therebetween a relatively narrow gap 8.

The magnetic rings 4,5 are constructed in such a way that the poles thereof are provided on the flanks of the rings. In this case the poles can be individual poles at a predefined distance disposed on a circular path of the flank surface. The flank surface of the rings 4,5 can alternatively be permanently magnetized so that circular magnetic poles are provided, the direction of magnetization in the circular poles being axially arranged so that the magnetic lines of force or field lines within the circle lines of the poles emerge substantially perpendicularly from the flank surfaces. A plurality of pairs of circular north and south pole rings can be arranged concentrically to each other and may be constructed from such material as Alnico alloy or simply as permanent magnets of an oxide sintered member or in the form of plastic bonded permanent magents.

Figure 1:
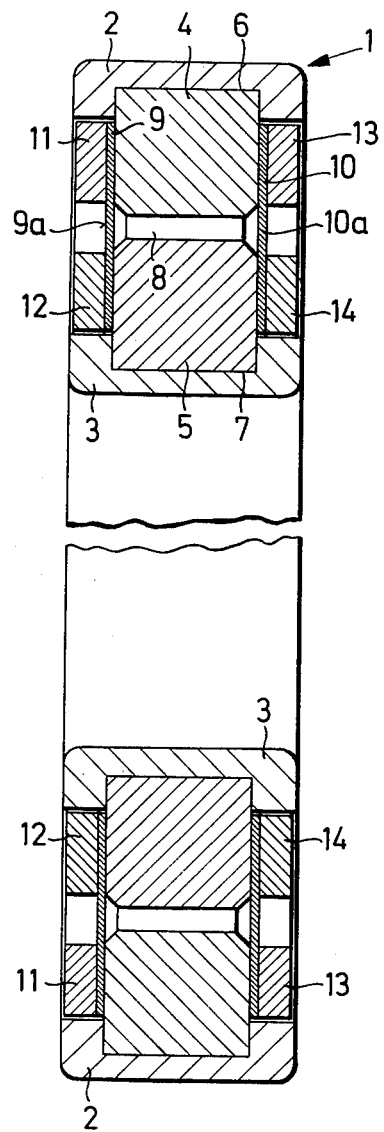
FIG. 1 is an axial sectional view through a first sliding ring seal constructed in accordance with this invention, and illustrates a sealing disc at each axial end face thereof sandwiched between pairs of magnetic rings and pairs of ferromagnetic retaining rings.

Resting against the flank surfaces of the magnetic rings 4,5 are annular sealing discs or sealing foils 9,10 formed on non-metallic, flexible, elastomeric material, such as polyethylene or similar copolymeric or polymeric plastic material. The material is preferably gas tight and has a high degree of smoothness and slidability (Teflon). The sealing discs 9,10 are retained against the rings 4,5 by independent retaining rings 11,12 and 13,14. The retaining rings 11 through 14 are constructed of magnetically attractable or ferromagnetic material and are maintained axially inwardly drawn against the discs 9,10, respectively, by the magnetic force of the rings 4,5. The retaining rings 11 through 14 consist of soft iron or steel, and the axial thickness thereof as viewed in FIG. 1 is such that the magnetic field lines which extend from one pole to the next in their entirety have a closed loop within the associated retaining ring 11 through 14.

If the annular member 2 is stationary, as by being fixed in a housing of a machine part, there is no relative motion between the retaining rings 11 and 13 and the permanent magnetic ring 4. There is also no such relative motion between the retaining rings 12,14 and the discs 9,10. Relative sliding motion takes place between the permanent magnetic ring 5 and the peripheral portions of the sealing discs 9,10 lying against its flanks. Preferably the axial dimension of the annular members 2,3 is such that all of the components, including the axially outer most rings 11,12 and 13,14 can be disposed entirely within the confines defined by the axial outer most faces of the annular members 2,3.

To enable a large magnetic force to be exerted by the permanent magnetic rings 4,5, they are provided with a correspondingly large cross section. The rings may have a width of at least half their height or the width may alternatively occupy the entire height and more.

The sealing discs 9,10 have a high degree of flexibility so that proper contact is insured in the event of axial displacement of one annular member 3 and/or 4 relative to the other, and the assurance of contact is achieved by the separate construction of the sealing discs 9,10 as independent components separate and apart from the retaining rings 11 through 14.

In order to increase the flexibility of a circumferential mid-zone 9a,10a of the sealing discs 9,10, respectively, the circumferential mid-zones 9a,10a may be of a reduced thickness than peripheral outboard and inboard portions thereof. The material of the mid-zones 9a,10a may also be subjected to appropriate stretching in order to increase flexibility. However, the outer peripheries of the discs 9,10 are constructed to have a relatively stiff edge to prevent the sealing discs from wandering (rotating) more particularly at high rotation speeds and this construction also prevents the sealing discs 9,10 from bending when striking the annular members 2,3 during radial displacement of the parts when in operation. Preferably the sealing discs 9,10 are kept as thin as possible to provide gas tightness and a thickness down to approximately 0.1 mm is considered satisfactory.

Figure 2:
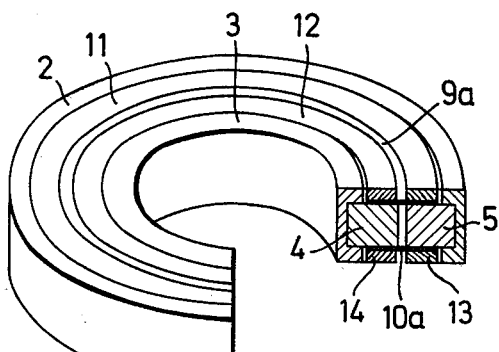
FIG. 2 is a perspective view with a portion thereof broken away for clarity of the sliding ring seal of FIG.

Turning now to FIG. 3 of the drawings, a ball bearing 15 is illustrated having associated therewith a built-in sliding ring seal of the type similar to that heretofore described relative to FIGS. 1 and 2. The bearing 15 includes bearing races 16,17 having respective annular or peripheral recesses 18,19 in which at each axial end is disposed a sliding ring seal. The bearing races 16,17, and particularly the axially outwardly opening faces of the recesses 17,18 preform a function equivalent to that of separate retaining rings so that a sealing disc 9 may bear directly thereagainst. A cage or retainer 20 for balls 21 of the bearing is disposed between the races 16,17.

The magnetic force of annular magnetic rings 4,5 insures that the magnetic rings themselves are retained in the appropriate bearing race 16 or 17 and at the same time are drawn axially under the magnetic force toward the faces of the recesses 17,18 to sandwich in a gripping fashion the outer periphery and inner periphery of the sealing disc 9 against the faces of the annular members or races 16,17. By the same token the magnetic force of the magnetic rings 4,5 draws respective retaining rings 13,14 axially inwardly to grip the sealing disc 10 therebetween.

The magnetic rings 4,5 of the bearing 15 are not connected to the bearing races 16,17 other than that afforded by the magnetic attraction. Sliding of the sealing discs takes places during rotation thereof on the surfaces or faces of the grooves 18,19, both those that face radially inwardly and axially outwardly.

In the embodiment of the invention illustrated in FIG. 4 a sliding ring seal 22 is disposed within an annular gap 23 between bearing races 24,25 or a ball bearing 26. The magnetic rings 4,5 in this case are, however, adhesively joined at their peripheries to internal surfaces 24a or 25a of the bearing races 24,25. The sealing discs 9,10 and the independent retaining rings 11,12 or 13,14 are disposed on both sides of the bearing 26. The advantage of this embodiment is that the bearing races 24,25 of the bearing 26 require no recesses or grooves, such as those indicated by the reference numerals 18 and 19 in the bearing 15 of FIG. 3. A very effective seal is obtained because two sealing discs 9,10 on each side of the ring balls 21 seal the interior of the bearing against atmosphere.

In accordance with the embodiment of the invention illustrated in FIG. 5, the same is substantially as that of FIG. 3. However, in the case of the bearing 15 of FIG. 5 the separate retaining rings 13,14 of FIG. 3 are substituted for by a single annular retaining ring or disc 27 which extends over both of the magnetic rings 4,5 and also covers the gap 8 therebetween.

While preferred forms and arrangements of parts have been shown in illustrating the invention, it is to be clearly lnderstood that various changes in detail and arrangement of parts may be made without departing from the spirit and scope of this disclosure.

We claim:

1. A sliding ring seal for bearings comprising a pair of annular members disposed in telescopic relationship with axes thereof coincident, a pair of annular rings constructed of magnetic material, a first ring being contiguous a first of said annular members and a second ring being contiguous a second of said annular members, said rings being in a generally common radial plane, a non-metallic flexible annular sealing disc bearing against said pair of rings and spanning an annular gap therebetween, a pair of annular retaining rings constructed of magnetically attractable material, a first of said retaining rings and the first of said megnetic rings having sandwiched therebetween a first peripheral portion of said sealing disc whereby the magnetic attraction between said last-mentioned two rings applies a gripping force therebetween upon said first peripheral disc portion, and a second of said retaining rings and the second of said magnetic rings having sandwiched therebetween a second peripheral portion of said sealing disc whereby the magnetic attraction between said last-mentioned two rings applies a gripping force therebetween upon said second peripheral disc portion.

2. The sliding ring seal as defined in claim 1 wherein said pair of magnetic rings are axially inboard of said pair of retaining rings.

3. The sliding ring seal as defined in claim 1 wherein said pair of magnetic rings are axially outboard of said pair of retaining rings.

4. The sliding ring seal as defined in claim 1 wherein said pair of annular members in radial cross section are of a generally U-shaped configuration each defined by a peripheral wall and a pair of radially directed walk defining an annular recess therebetween, and said first and second magnetic rings are seated in respective first and second ones of said grooves of said annular members.

5. The sliding ring seal as defined in claim 1 wherein the thickness of each of said megnetic rings is such that the magnetic field lines or lines of force define a closed loop with its associated retaining ring, and the field lines as viewed in radial section correspond generally to the radial dimension of the magnetic rings.

6. The sliding ring seal as defined in claim 1 wherein said pair of annular members each have a peripheral inner recess defining an axially outwardly facing peripheral surface, and said megnetic rings are seated within respective ones of said recesses.

7. The sliding ring seal as defined in claim 1 wherein said pair of annular members each have a peripheral inner recess defining an axially outwardly facing peripheral surface, said magnetic rings are seated within respective ones of said recesses and another non-metallic flexible annular sealing disc having first and second peripheral portions sandwiched between the peripheral surfaces of first and second of said annular members respectively.

8. The sliding ring seal as defined in claim 1 means fixedly securing said magnetic rings each to an associated annular member.

9. The sliding ring seal as defined in claim 1 including a second pair of annular retaining rings composed of a third retaining ring axially aligned with the first of said magnetic rings and a fourth retaining ring axially aligned with the second of said magnetic rings, and another non-metallic flexible annular sealing disc having a first peripheral portion sandwiched between the third retaining ring and the first magnetic ring and a second peripheral portion sandwiched between the fourth retaining ring and the second magnetic ring.

10. The sliding ring seal as defined in claim 1 wherein said sealing disc is more flexible at its mid circumference than at its inner and outer edges.

11. The sliding ring seal as defined in claim 9 wherein said pair of annular members each have a peripheral inner recess defining an axially outwardly facing peripheral surface, and said sealing discs, magnetic rings and retaining rings are seated within respective ones of said recesses.

12. A sliding ring seal for bearings comprising a pair of annular members disposed in telescopic relationship with axes thereof coincident, a pair of annular rings constructed of magnetic material, a first ring being contiguous a first of said annular members and a second ring being contiguous a second of said annular members, said rings being in a generally common radial plane, a non-metallic flexible annular sealing disc bearing against said pair of rings and spanning an annular gap therebetween, an annular retaining ring constructed of magnetically attractable material, a first peripheral portion of said retaining ring and the first of said magnetic rings having sandwiched therebetween a first peripheral portion of said sealing disc whereby the magnetic attraction between said last-mentioned two rings applies a gripping force therebetween upon said first peripheral disc portion, and a second peripheral portion of said retaining ring and the second of said magnetic rings having sandwiched therebetween a second peripheral portion of said sealing disc whereby the magnetic attraction between said last-mentioned two rings applies a gripping force therebetween upon said second peripheral disc portion.

13. The sliding seal as defined in claim 12 including another non-metallic flexible annular sealing disc having first and second peripheral portions sandwiched between first and second of said annular members and said first and second retaining rings respectively.

14. The sliding ring seal as defined in claim 12 wherein said pair of annular members each have a peripheral inner recess defining an axially outwardly facing peripheral surface, and said megnetic rings are seated within respective ones of said recesses.

15. The sliding ring seal as defined in claim 13 wherein said pair of annular members each have a peripheral inner recess defining an axially outwardly facing peripheral surface, and said magnetic rings are seated within respective ones of said recesses.

* * * * *